United States Patent [19]

Shaw

[11] Patent Number: 5,189,713
[45] Date of Patent: Feb. 23, 1993

[54] ELECTRO-OPTIC DEVICE

[75] Inventor: Robert N. Shaw, Ipswich, England

[73] Assignee: BT&D Technologies Limited, Ipswich, England

[21] Appl. No.: 602,276

[22] PCT Filed: May 23, 1989

[86] PCT No.: PCT/GB89/00565
§ 371 Date: Nov. 14, 1990
§ 102(e) Date: Nov. 14, 1990

[87] PCT Pub. No.: WO89/11676
PCT Pub. Date: Nov. 30, 1989

[30] Foreign Application Priority Data

May 23, 1988 [GB] United Kingdom ........... 8812180

[51] Int. Cl.$^5$ .............................................. G02B 6/10
[52] U.S. Cl. .......................................... 385/2; 385/41
[58] Field of Search .......................... 350/96.11–96.14; 385/2, 3, 8, 9, 10, 41

[56] References Cited

U.S. PATENT DOCUMENTS

| | | | |
|---|---|---|---|
| 4,583,817 | 4/1986 | Papuchon | 350/96.14 |
| 4,652,078 | 3/1987 | Baratte et al. | 350/96.14 |
| 4,691,984 | 9/1987 | Thaniyavarn | 385/8 |
| 4,818,050 | 4/1989 | Duthie | 350/96.14 |
| 4,940,305 | 7/1990 | Thaniyavarn | 350/96.14 |
| 4,957,337 | 9/1990 | Ogawa et al. | 350/96.13 |
| 5,013,114 | 5/1991 | Young | 350/96.14 |

FOREIGN PATENT DOCUMENTS 2042212 9/1980 United Kingdom .

OTHER PUBLICATIONS

N.T.I.S. Tech Notes, No. 11, part B, Nov. 1985, p. 1284, Springfield, Va., US; "Reversing Optical Damage in LiNbO3 Switches", Paul McCaul, whole article.
Applied Physics Letters, vol. 47, No. 3, 1st, Aug. 1985, pp. 211-213, American Institute of Physics; C. M. Gee et al.: "Minimizing DC Drift in LiNbO3 Waveguide Devices".
Applied Physics Letters, vol. 49, No. 19, 10th Nov. 1986, pp. 1221-1223, American Institute of Physics; P. Skeath et al: "Novel Electrostatic Mechanism in the Thermal Instability of Z-Cut LiNbO3 Interferences".
Applied Optics, vol. 22, No. 13, 1st Jul. 1983, pp. 2034-2037, Optical Society of America; C. M. Gee et al: "Traveling-Wave Electrooptic Modulator"-p. 2036.
Alferness "Guided-Wave Devices for Optical Communication", IEEE J. Quan., Elec., vol. QE-17, No. 6, Jun. 1981, pp. 946-959.

Primary Examiner—John D. Lee
Assistant Examiner—John Ngo
Attorney, Agent, or Firm—Nixon & Vanderhye

[57] ABSTRACT

In electro-optic waveguide devices such as directional couplers and Mach-Zehnder interferometers having travelling-wave electrodes which overlie the waveguides, temperature sensitivity is reduced by arranging the ground plane electrode to overlie only part of the width of its associated waveguide portion. The invention has particular application to z-cut lithium niobate.

17 Claims, 3 Drawing Sheets

ELECTRO-OPTIC DEVICE

FIELD OF THE INVENTION

This invention relates to electro-optic waveguide devices and in particular but not exclusively to interferometers and directional couplers made from ferroelectric materials such as lithium niobate.

BACKGROUND OF THE INVENTION

Electro-optic materials, such as lithium niobate (LNB) and KTP, have refractive indices which vary according to the magnitude and direction of applied electric field. Waveguide devices based on such materials are potentially useful for optical fibre communication and signal processing systems. Typically such devices are required to operate with light of wavelengths in the range 0.6 to 1.6 $\mu$m, and in particular with light in the range 1.3 to 1.6 $\mu$m.

There are two basic device types: directional couplers; and Mach-Zehnder (MZ) interferometers. The first of these utilises the electro-optic effect to control the coupling between a pair of adjacent waveguides. By controlling their refractive indices it is possible to couple light from one waveguide to the other or vice versa. In an MZ interferometer an input waveguide is coupled to an output waveguide by a pair of waveguide arms. Each arm has an associated electrode by means of which it is possible to control the refractive indices of, and hence the velocity of propagation in, the two arms independently. It is therefore possible, by controlling the applied electric fields, to produce phase differences between signals travelling in the two arms resulting in constructive or destructive interference when they are combined. Thus it is possible to amplitude modulate input optical signals according to the voltage difference between the electrodes. Unfortunately, materials such as LNB, which exhibit the electro-optic effect tend also to be pyroelectric: electric fields are produced within the material as the result of a temperature change. With some materials, notably z-cut LNB, the pyroelectric effect is so strong that a temperature change of a degree or less may be sufficient to produce an electric field comparable to that applied to produce switching of states in a directional coupler or MZ interferometer made of the material. Such electric fields strongly affect the optical states of the devices. Consequently it is necessary, with materials such as z-cut LNB which exhibit a strong pyroelectric effect, to provide very precise temperature control if reliable and repeatable performance is to be achieved from electro-optic waveguide devices based on such materials. Clearly the need to provide precise temperature control is a disadvantage and a disincentive to the use of such materials. With z-cut LNB this disincentive is so strong that despite its stronger electro-optic effect, which would make possible the use of lower operating voltages and shorter devices, the material is eschewed in favouf of x-cut LNB, which is less strongly pyroelectric, despite the latter's inferior electro-optic properties. Unfortunately, electro-optic devices made from x-cut LNB, unlike those made from z-cut LNB, require complex electrode structures which are generally incompatible with high speed operation.

The problems of thermal instability are particularly severe in devices in which there is a non-symmetrical arrangement of electrodes. Examples of devices with non-symmetrical electrode arrangements include directional couplers and MZ interferometers having travelling-wave electrodes. The use of travelling-wave electrodes potentially enables the production of devices capable of very high speed operation (typically switchable at gigabit rates). In such devices the electrode arrangement consists of a first electrode, overlying a first waveguide arm of the device and configured as a transmission line, generally in the form of a narrow strip, and a second electrode, the ground electrode, overlying a second waveguide arm of the device, and generally much more extensive than the first electrode.

The problem of the thermal instability of devices made from z-cut LNB has been investigated, see for example the paper by Skeath et al, Appl. Phys. Lett., 49 (19), Nov. 10, 1986, pp 1221-1223, and that by Gee et al, Appl. Phys. Lett., 47 (3), Aug. 1, 1985, pp 211-213, but as yet no one appears to have devised a workable solution which would enable the system application of z-cut LNB without very precise temperature control, particularly in the case that the electrodes are non-symmetrically disposed over the waveguide branches.

SUMMARY OF THE INVENTION

According to the present invention there is provided an electro-optic waveguide device comprising first and second waveguide segments, a travelling-wave electrode having a portion aligned with and overlying a first elongate portion of said first segment, a ground electrode having a portion overlying and extending along a second elongate portion of said second segment, characterised in that said ground electrode overlies only part of the width of said second waveguide segment throughout said second elongate portion.

By offsetting the electrodes in this way the temperature sensitivity of devices made from z-cut LNB is markedly reduced.

In FIG. 1 of the above referenced paper by Gee et al there is shown a Mach-Zehnder interferometer with what is termed a "d.c bias" built-in by making a section of one interferometer arm, that under the ground electrode, appreciably wider than the second interferometer arm. However, neither this nor the second described method of providing a built-in bias, that is by making the two arms of the interferometer different lengths, is favoured by Gee et al over the simpler alternative of applying, in operation, an appropriate electrical d.c bias. The relevance of the above referenced FIG. 1 is that while the 'fattened' waveguide portion extends towards the other (second) interferometer arm, the side of the gound plane electrode which lies closest to the second interferometer arm is straight and is aligned with the relevant edge of the waveguide regions which make up the bulk of the first interferometer arm. Consequently, part of the waveguide associated with the ground plane electrode is not actually covered by the ground plane electrode. It is not clear whether the illustrated electrode configuration is the result of a drafting error, as it is nowhere mentioned in the text and, significantly, differs from the more detailed FIG. 1 in the similar paper of C. M. Gee and G. D. Thurmond published in SPIE. Vol 47, Optical Technology for Microwave Applications (1984), pp 17-22, which shows an identical waveguide structure, but an electrode configuration in which the inner edges of the electrodes are coterminous with their respective waveguides.

A possible reason for Gee et al forming the ground plane electrode as shown in FIG. 1 of the first referenced of their papers is their interest in maximising the ratio of lateral resistance relative to longitudinal resistance for the purpose of minimising voltage induced drift. It is clear that Gee et al did not appreciate that the position of the edge of the ground plane electrode relative to the edge of the associated waveguide was in any way relevant to the problems of pyroelectric drift. Consequently, it is believed that the above referenced papers by Gee et al are of no further relevance to the present invention.

BRIEF DESCRIPTION OF THE DRAWINGS

Preferred embodiments of the present invention will now be described, by way of example only, with reference to the accompanying drawings in which.

DETAILED DESCRIPTION OF THE INVENTION

Figure 1A:
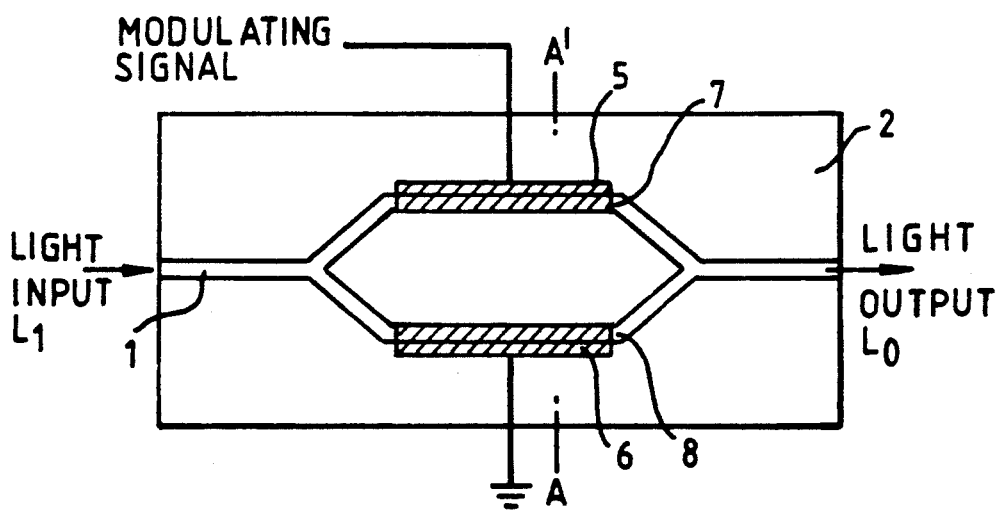
FIG. 1(a) is a schematic plan view of a conventional Mach-Zehnder interferometer with low speed electrodes.
Figure 1B:
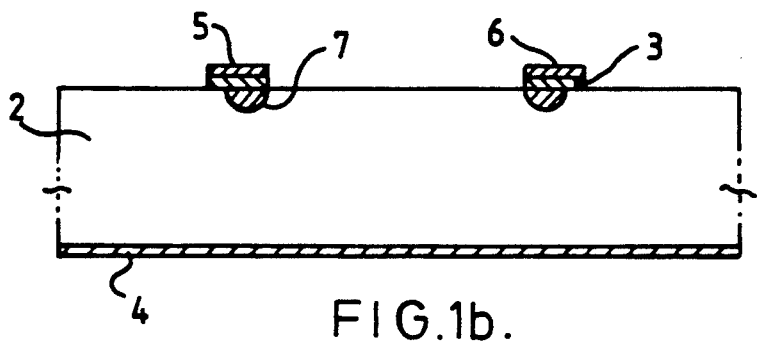
FIG. 1(b) shows schematically a cross section, along the line A—A', through the device of FIG. 1(a).

In FIG. 1(a)-1(e) are shown conventional directional couplers and MZ interferometers with electrode structures suitable for use with z-cut LNB. An optical waveguide pattern 1 is formed in a lithium niobate substrate 2 by selective diffusion of titanium. A buffer layer 3 of silicon dioxide, alumina or indium tin oxide is, optionally, formed over the waveguide pattern 1. Electrodes 5 and 6 of gold, aluminum or an aluminum alloy are formed on the buffer layer over part of the waveguide 1. The substrate 2, which is a sawn and polished slice of crystal, is typically 40 mm long, 10 mm wide and 1 mm thick. The underside of the substrate is metallised 4. For an MZ interferometer the waveguides are approximately 5 μm wide, with the waveguide arms 17 and 18 separated by about 10 μm.

When a voltage is applied across the electrodes, some of the field passes through the waveguides. For a z-cut LNB device, it is the vertical component of the field which changes the refractive index of the material.

Figure 5:
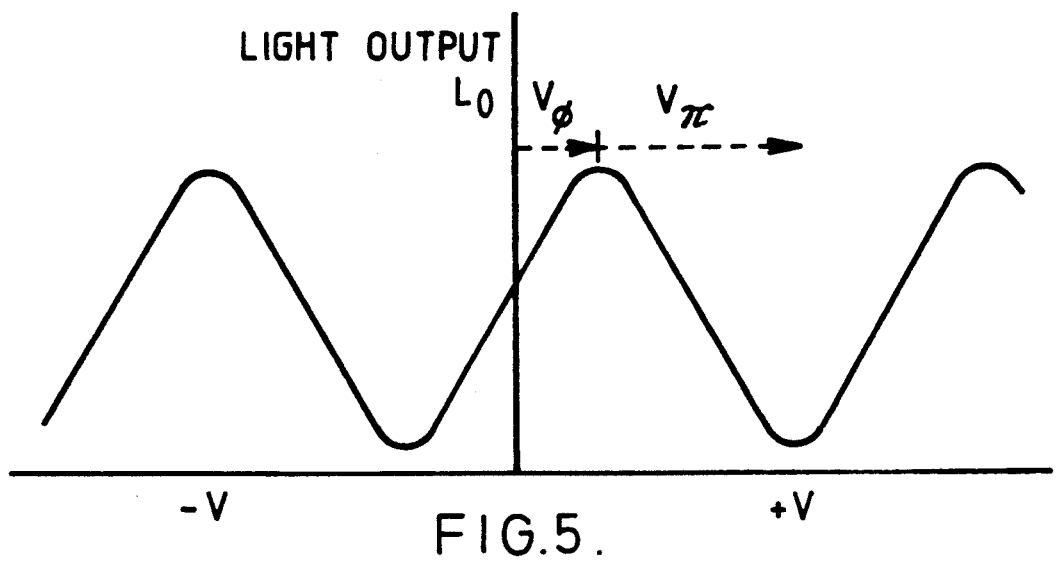
FIG. 5 shows the transfer characteristic of an MZ interferometer.

The transfer characteristic of an MZ interferometer is shown in FIG. 5. The characteristic is essentially a periodic cos squared function, with peaks occurring where there is constructive interference, and troughs where there is destructive interference. The electrode voltage required to drive the output from a peak to a trough is the switching voltage $V_\pi$. The voltage required to obtain the output peak nearest to zero volts is the phase bias voltage $V_o$. A typical switching voltage for 20 mm long electrodes, on z-cut LNB, is about 3.5 volts. The phase bias voltage can be any value up to the switching voltage. FIGS. 1a and 1d show devices having low speed electrode arrangements, in each case the electrode to which the modulating signal is applied, hereinafter the 'live electrode' 5,15, and the electrode which is connected to ground, hereinafter the 'ground electrode' 6,16, are the same size and shape and are disposed relative to their respective waveguide portions 7,17 and 8,18 in essentially the same way.

Figure 1C:
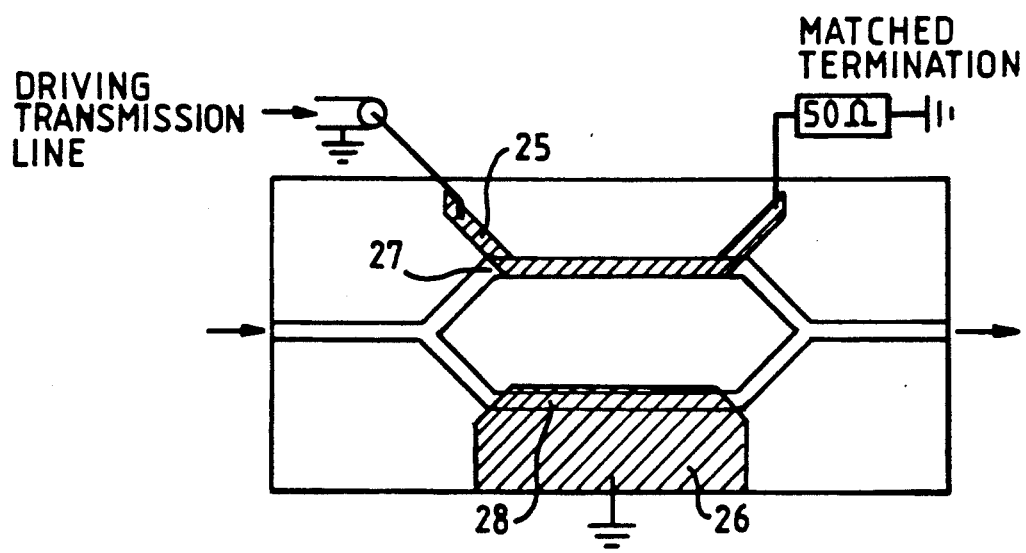
FIG. 1(c) is a schematic plan view of a conventional Mach-Zehnder interferometer with a travelling-wave electrode structure for high speed operation.
Figure 1D:
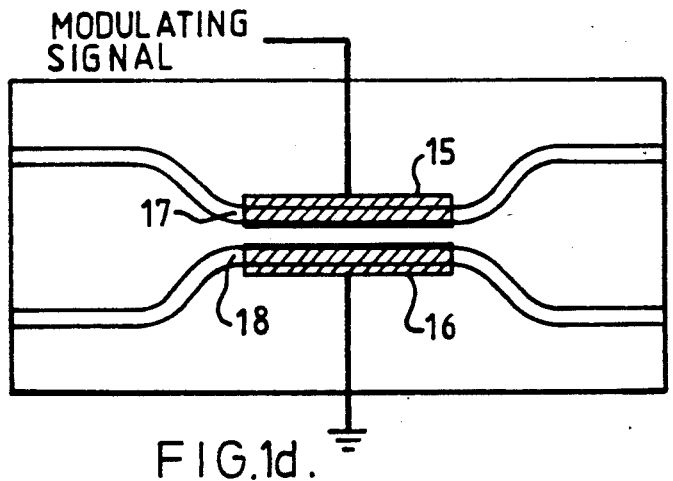
FIG. 1(d) is a schematic plan view of a conventional directional coupler with low speed electrodes.
Figure 1E:
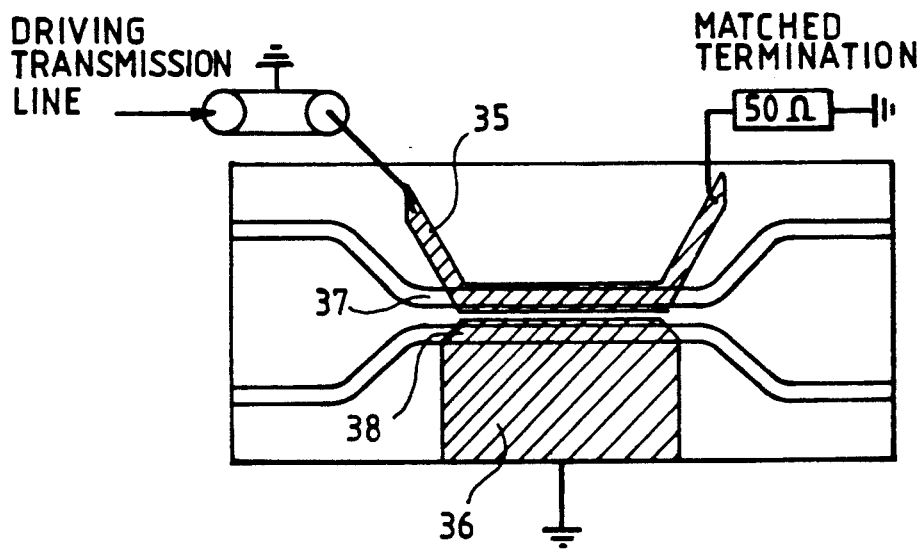
FIG. 1(e) is a schematic plan view of a conventional directional coupler with a travelling-wave electrode structure for high speed operation.

By way of contrast, FIGS. 1c and 1e show devices having electrodes arranged for high speed operation. In each case there is a travelling-wave electrode 25,35 which is in the form of a stripline not much wider (width typically 13 μm) than the associated waveguide portion 27,37 (typical width 9 μm) and which overlies and extends along the top of that waveguide portion, while the ground electrode 26,36 overlies its waveguide portion 28,38 to a similar extent but extends laterally to cover a much larger area of substrate than the travelling wave electrode does. Devices with such an electrode arrangement are particularly sensitive to temperature changes, especially when made from z-cut LNB.

Figure 2:
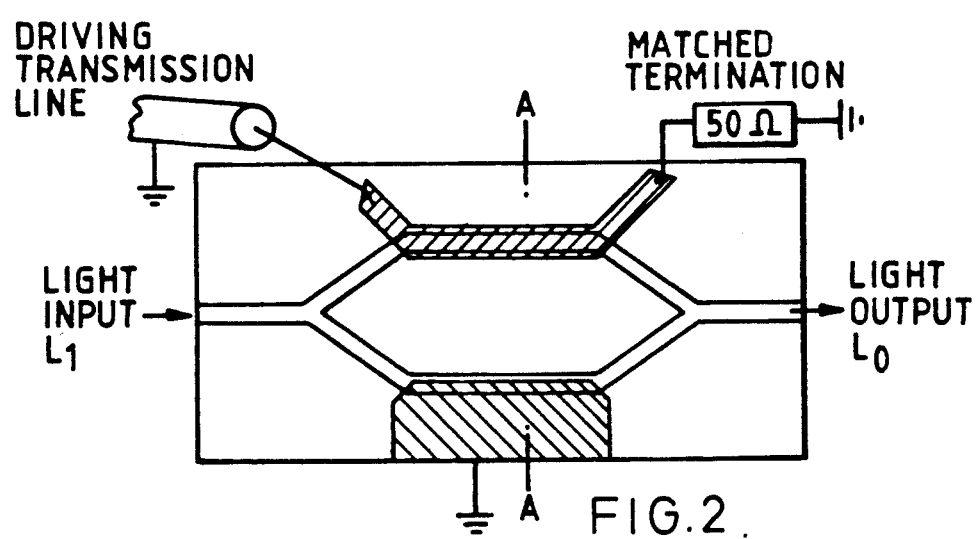
FIG. 2 is a schematic plan view of a Mach-Zehnder interferometer according to the present invention.
Figure 3:
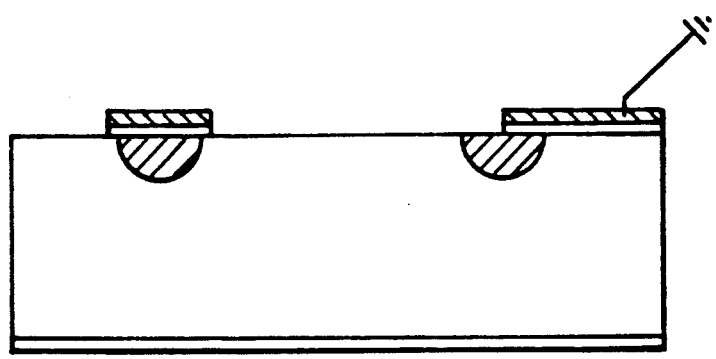
FIG. 3 is a schematic cross-sectional view along the line A—A of FIG. 2.
Figure 4:
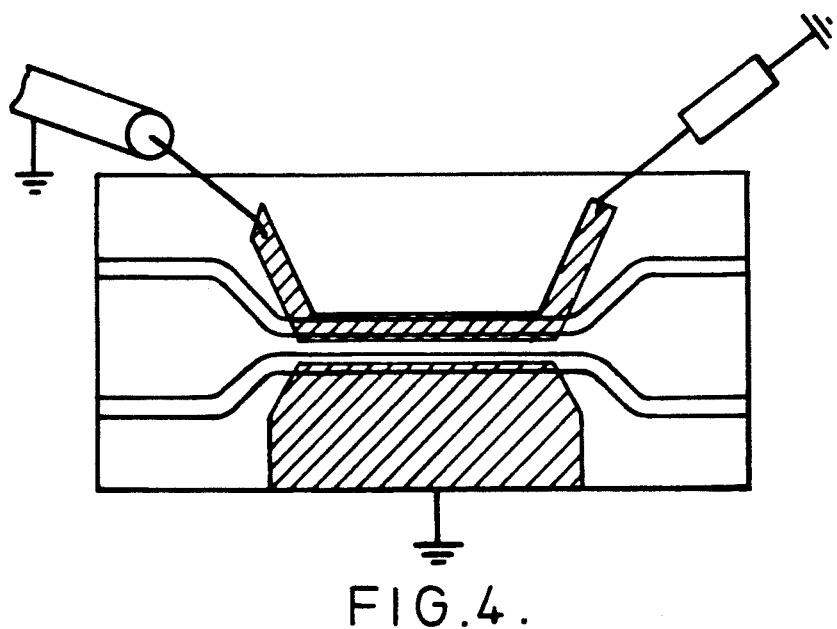
FIG. 4 is a schematic plan view of a directional coupler according to the present invention.

We have discovered that if, instead of the electrode arrangement shown in FIGS. 1c and 1e, an electrode arrangement of the type shown in FIGS. 2 and 4 is used the degree of temperature sensitivity can be markedly reduced, even in z-cut LNB. The difference between the old electrode arrangement and that according to the invention is that the larger electrode, in this case the ground electrode, instead of covering the entire width of its associated waveguide portion extends only part way over its associated waveguide portion. Typically, optimum results will be obtained with the ground electrode offset to expose about half the width of its associated wabeguide portion. Where the limbs of the waveguide are 7-8 μm wide the ground electrode will then typically be offset to expose 3-4 μm of the width of the waveguide. That is to say, although no part of the ground plane electrode overlies more than 90% of the width of said associated waveguide, said ground electrode can overlie the associated waveguide to between 30% and 70%.

There is no necessity for the electrode separation to be increased (a typical separation is 10 μm), in effect the electrodes can both be moved by the same amount relative to the waveguides. Such a rearrangement is possible without exposing the waveguide "previously" covered by the travelling-wave electrode because the travelling-wave electrode is generally wider than the waveguide (to ease alignment problems and to reduce the risk of electro-migration). If the waveguide which is under the travelling-wave electrode were to be part exposed as a result of that electrode's repositioning, some of the benefits of exposing the other waveguide could be lost as the result of unscreened pyroelectric charge being present over both waveguides. Moreover, if the travelling-wave electrode were to cover only part of the width of its associated waveguide, it is likely that the switching voltage would be increased.

Our understanding of the origin of the improved temperature stability of device according to the invention is given below. Electrodes on the surface of a pyroelectric material give rise to local variations in any pyroelectric field produced. In devices made in z-cut LNB (but not generally in x-cut LNB) the electrodes are immediately over the waveguides, consequently the waveguides are likely to be subjected to the local variations in field associated with the presence of the electrodes. Where there is a symmetrical electrode arrangement, both waveguide portions experience similar variations in pyroelectric field as the temperature of the substrate varies. If there is a non-symmetrical electrode arrangement it is likely that the two waveguide portions will be subject to unequal pyroelectric fields as the temperature of the substrate varies. The imbalance in the pyroelectric fields results in a temperature induced shift of the electro-optic transfer characteristic and thus an increased temperature sensitivity. By uncovering part of the waveguide associated with the ground plane electrode, the field lines associated with the unscreened charge are caused to pass through the waveguide as they do through the waveguide associated with the other electrode. This contrasts with the situation in prior art devices, where the ground plane electrode covers and extends significantly beyond the edges of its associated waveguide, which results in the field lines associated with the unscreened pyroelectric charge and largely or wholly missing the waveguide.

Clearly the invention is applicable to any material which exhibits both the electro-optic effect and the pyroelectric effect and for which the electrodes are arranged generally to overlie the waveguides/waveguide portions, that is those in which the component of electric field normal to the substrate surface (the 'vertical' field) influences the refractive index of the waveguide. With x-cut LNB the usual electrode arrangement involves the electrodes lying adjacent rather than above the waveguides, since in the x-cut material it is the component of electric field parallel to the substrate surface which influences the refractive index of the waveguide. Generally temperature sensitivity ascribable to distortions of the pyroelectric field caused by unbalanced electrode disposition are likely to be worst where there is a travelling-wave electrode arrangement and it is to such aplications that the present invention is particularly directed.

I claim:

1. An electro-optic waveguide device of the type in which first and second electrodes are formed on a surface of a substrate of a pyroelectric material, the substrate including first and second optical waveguides which are each at least partially overlain by a respective one of said electrodes, the optical waveguides having a refractive index which can be adjusted by application of an electric field via said electrodes, the refractive index changing with changes in a component of said field, which component is substantially perpendicular to said surface on which said electrodes are formed, wherein said first and second electrodes comprise respectively a ground plane electrode and a travelling-wave electrode, the improvement comprising fixing the ground plane electrode relative to said first waveguide such that throughout the entire overlain length of said first waveguide the ground plane electrode overlies less than the whole width thereof, thereby reducing the temperature sensitivity of the device.

2. An electro-optic waveguide device comprising a travelling-wave structure having a ground plane electrode, the ground plane electrode overlying an associated waveguide, wherein said associated waveguide has substantially constant width throughout that portion overlain by the ground plane electrode, the ground plane electrode overlying less than the whole width of said associated waveguide throughout substantially the whole said portion, and the travelling-wave electrode overlying the full width of a second waveguide.

3. A device as claimed in claim 2 wherein the device is formed in a z-cut lithium niobate substrate.

4. An electro-optic waveguide device formed on a z-cut lithium niobate substrate, the device having an asymmetric planar electrode structure comprising a pair of electrodes, a first electrode of said pair having a larger area than the second electrode of said pair, wherein the electrode larger area overlies less than the whole width of its associated waveguide, the second electrode overlying a greater proportion of the width of its associated waveguide, so that the sensitivity of the device by pyroelectric fields is reduced.

5. An electro-optic waveguide device as claimed in claim 4 wherein said associated waveguide has substantially constant width throughout that portion overlain by the electrode of larger area.

6. An electro-optic waveguide device as claimed in claim 4 or 5 wherein throughout that portion overlain said electrode overlies said associated waveguide by a substantially constant amount.

7. An electro-optic waveguide device as claimed in claim 5 wherein said electrode overlies said associated waveguide to between 30% and 70%.

8. An electro-optic waveguide device formed from a z-cut lithium niobate substrate, the device comprising a travelling-wave structure having a ground plane electrode, the ground plane electrode overlying an associated waveguide, wherein said associated waveguide has substantially constant width throughout that portion overlain by the ground plane electrode, the ground plane electrode overlying less than the whole width of said associated waveguide throughout substantially the whole said portion, and the travelling-wave electrode overlying substantially the full width of a second waveguide.

9. A device as claimed in claim 8 wherein the travelling-wave electrode overlies the full width of the second waveguide.

10. A device as claimed in any one of claims 2, 3, 8 or 9 wherein no part of the ground plane electrode overlies more than 90% of the width of said associated waveguide segment.

11. A device as claimed in any one of claims 2, 3, 8 or 9 wherein the ground plane electrode overlies only 40% to 60% of the width of said associated waveguide throughout the portion overlain.

12. A device as claimed in any one of claims 2, 3, 8 or 9 wherein the travelling-wave electrode is wider than the second waveguide.

13. A device as claimed in claim 12 wherein the portion of the travelling-wave electrode which overlies the second waveguide is between 10 and 15 $\mu$m wide, and the second waveguide is between 5 and 10$\mu$ wide.

14. A device as claimed in any one of claims 2, 3, 8 or 9 wherein the device is an interferometer.

15. A device as claimed in any one of claims 2, 3, 8 or 9 wherein the device is a directional coupler.

16. An electro-optic device according to claimed 15 wherein the travelling-wave electrode overlies substantially the whole width of said second waveguide portion.

17. An electro-optic device according to claim 1 or claim 16 wherein the substrate comprises z-cut lithium niobate.

* * * * *